(12) United States Patent
Iwai et al.

(10) Patent No.: US 12,724,205 B2
(45) Date of Patent: Sep. 1, 2026

(54) QUANTUM DEVICE, QUANTUM COMPUTING DEVICE, AND QUANTUM COMPUTING METHOD

(71) Applicant: Fujitsu Limited, Kawasaki (JP)

(72) Inventors: Toshiki Iwai, Atsugi (JP); Yoshiyasu Doi, Yokohama (JP); Kenichi Kawaguchi, Ebina (JP); Tetsuya Miyatake, Isehara (JP); Tetsuro Ishiguro, Kawasaki (JP); Shintaro Sato, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 18/673,480

(22) Filed: May 24, 2024

(65) Prior Publication Data

US 2024/0369775 A1 Nov. 7, 2024

Related U.S. Application Data

(63) Continuation of application No. PCT/JP2021/043623, filed on Nov. 29, 2021.

(51) Int. Cl.
*G02B 6/35* (2006.01)
*G02B 26/08* (2006.01)

(52) U.S. Cl.
CPC ........ *G02B 6/3552* (2013.01); *G02B 26/0833* (2013.01)

(58) Field of Classification Search
CPC ........ G02B 6/35; G02B 6/3552; G06N 10/00; G06N 10/60
See application file for complete search history.

(56) References Cited

U.S. PATENT DOCUMENTS

| | | | |
|---|---|---|---|
| 11,126,062 B1 | 9/2021 | Kieling et al. | |
| 2006/0249670 A1 | 11/2006 | Monroe et al. | |
| 2008/0031296 A1 | 2/2008 | Spillane et al. | |
| 2008/0063339 A1 | 3/2008 | Spillane et al. | |
| 2019/0296211 A1 | 9/2019 | Chow et al. | |
| 2019/0325336 A1 | 10/2019 | Reilly | |
| 2019/0325337 A1* | 10/2019 | Reilly | G06N 10/70 |

OTHER PUBLICATIONS

Maximilian Ruf et al., “Quantum networks based on color centers in diamond”, Journal of Applied Physics, vol. 130, No. 7, May 10, 2021, pp. 1-20, XP093229439.

Noel H. Wan et al., “Large-scale integration of artificial atoms in hybrid photonic circuits”, Nature, vol. 583, No. 7815, Jul. 8, 2020, pp. 226-231, XP037187512.

(Continued)

*Primary Examiner* — Tina Wong
(74) *Attorney, Agent, or Firm* — Fujitsu Intellectual Property Center

(57) ABSTRACT

A quantum device includes: three first optical waveguides to which a quantum bit is coupled; a second optical waveguide; a beam splitter; a first optical switch that is provided to each of the three first optical waveguides and conducts switching between optical connection and disconnection between the first optical waveguide and the second optical waveguide; and a second optical switch that conducts switching between optical connection and disconnection between the second optical waveguide and the beam splitter.

12 Claims, 5 Drawing Sheets

(56) References Cited

OTHER PUBLICATIONS

David Awschalom et al., "Development of Quantum InterConnects (QuICs) for Next-Generation Information Technologies", PRX Quantum, vol. 2, No. 1, Feb. 1, 2021, XP093099043, pp. 1-31.
Extended European Search Report dated Dec. 11, 2024 for corresponding European Patent Application No. 21965699.8 [8 pages].
WIPO—International Search Report with partial English language translation and Written Opinion mailed on Feb. 8, 2022 for International Application No. PCT/JP2021/043623, 10 pages.
Frank, Arute, et al., "Quantum supremacy using a programmable superconducting processor", Nature, vol. 574, pp. 505-511, Jul. 22, 2019.
Kalb, N. et al., "Entanglement distillation between solid-state quantum network nodes", Science 356, pp. 928-932, Jun. 2, 2017.

* cited by examiner

FIG. 3

QUANTUM DEVICE, QUANTUM COMPUTING DEVICE, AND QUANTUM COMPUTING METHOD

CROSS-REFERENCE TO RELATED APPLICATION

This application is a continuation application of International Application PCT/JP2021/043623 filed on Nov. 29, 2021 and designated the U.S., the entire contents of which are incorporated herein by reference.

FIELD

The present disclosure relates to a quantum device, a quantum computing device, and a quantum computing method.

BACKGROUND

As one of next-generation computing, a quantum computer has been researched and developed. As a structure of a quantum device including quantum bits used in the quantum computer, there is a two-dimensional structure in which one quantum bit is coupled to a plurality of quantum bits. While two adjacent quantum bits may be directly coupled with each other in the two-dimensional structure, it is not possible to directly couple two non-adjacent quantum bits with each other. Thus, at a time of coupling the two non-adjacent quantum bits with each other, a swap operation for relaying quantum information using a quantum bit therebetween is performed.

Related art is disclosed in U.S. Pat. Nos. 10,622,536, 7,546,000, U.S. Patent Application Publication No. 2019/0325336, and U.S. Pat. No. 7,529,437.

Non-Patent Document

Further, related art is disclosed in Non-Patent Document 1: A. Frank, et al., "Quantum supremacy using a programmable superconducting processor", Nature 574, 505 (2019) and Non-Patent Document 2: N. Kalb, et al., "Entanglement distillation between solid-state quantum network nodes", Science 356, 928 (2017).

SUMMARY

According to an aspect of the embodiments, a quantum device includes: three first optical waveguides to which a quantum bit is coupled; a second optical waveguide; a beam splitter; a first optical switch that is provided to each of the three first optical waveguides and conducts switching between optical connection and disconnection between the first optical waveguide and the second optical waveguide; and a second optical switch that conducts switching between optical connection and disconnection between the second optical waveguide and the beam splitter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a quantum device according to a third embodiment.

DESCRIPTION OF EMBODIMENTS

A quantum error rate increases as the number of the swap operations increases. In addition, as the number of the swap operations increases, more time is spent on the swap operations, which reduces the number of quantum operations that may be performed in a coherence time.

An object of the present disclosure is to provide a quantum device, a quantum computing device, and a quantum computing method capable of coupling quantum bits without performing a swap operation.

Hereinafter, embodiments of the present disclosure will be specifically described with reference to the accompanying drawings. Note that, in the present specification and drawings, components having substantially the same functional configuration may be denoted by the same reference sign to omit redundant descriptions. In the present disclosure, an X1-X2 direction and a Y1-Y2 direction are assumed to be directions orthogonal to each other.

First Embodiment

Figure 1:
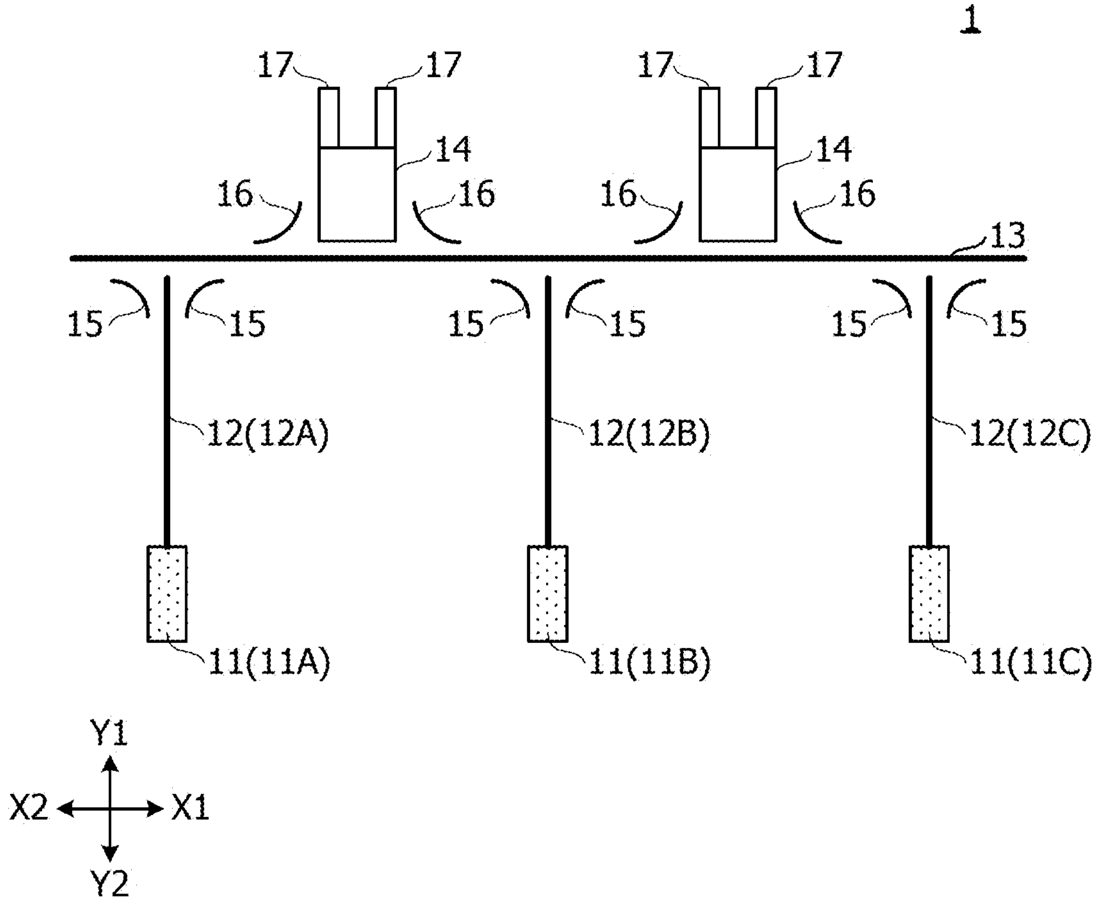
FIG. 1 is a diagram illustrating a quantum device according to a first embodiment.

First, a first embodiment will be described. The first embodiment relates to a quantum device. The quantum device according to the first embodiment is used for a quantum computing device, such as a quantum computer or the like. FIG. 1 is a diagram illustrating the quantum device according to the first embodiment.

As illustrated in FIG. 1, a quantum device 1 according to the first embodiment includes three quantum bits 11, three first optical waveguides 12, one second optical waveguide 13, two beam splitters 14, six first optical switches 15, four second optical switches 16, and four photodetectors 17.

The three first optical waveguides 12 extend in the Y1-Y2 direction, and are arranged in parallel in the X1-X2 direction. Each one of the quantum bits 11 is directly coupled to the end portion on the Y2 side of the first optical waveguide 12. The quantum bit 11 includes, for example, a nanobeam structure including a diamond color center. The diamond color center emits photons when being irradiated with light. The second optical waveguide 13 extends in the X1-X2 direction, and is disposed in the vicinity of the end portions on the Y1 side of the three first optical waveguides 12 and in a manner of being spaced apart from the three first optical waveguides 12. The first optical waveguides 12 and the second optical waveguide 13 are diamond optical waveguides, for example.

Two first optical switches 15 are disposed for each first optical waveguide 12 in the vicinity of the end portion on the Y1 side of the first optical waveguide 12. One of the first optical switches 15 is disposed on the X1 side of the first optical waveguide 12, and the other is disposed on the X2 side of the first optical waveguide 12. The first optical switch 15 conducts switching between optical connection and disconnection between the first optical waveguide 12 and the second optical waveguide 13. When the first optical switch 15 on the X1 side of the first optical waveguide 12 is turned on, light propagation is enabled between the first optical waveguide 12 and a part of the second optical waveguide 13 on the X1 side with respect to the first optical waveguide 12. When the first optical switch 15 on the X2 side of the first optical waveguide 12 is turned on, light propagation is enabled between the first optical waveguide 12 and a part of the second optical waveguide 13 on the X2 side with respect to the first optical waveguide 12. The first optical switch 15 includes, for example, a micro electro mechanical systems (MEMS) variable directional coupler.

Each one of the beam splitters 14 is disposed between contact points of the second optical waveguide 13 with the first optical waveguides 12. For example, a diamond photonic crystal, a mirror, or a directional coupler are used as the beam splitter 14.

Two second optical switches 16 are disposed in the vicinity of the second optical waveguide 13 for each of the beam splitters 14. One of the second optical switches 16 is disposed on the X1 side of the beam splitter 14, and the other is disposed on the X2 side of the beam splitter 14. The second optical switch 16 conducts switching between optical connection and disconnection between the beam splitter 14 and the second optical waveguide 13. When the second optical switch 16 on the X1 side of the beam splitter 14 is turned on, light propagation is enabled between the beam splitter 14 and a part of the second optical waveguide 13 on the X1 side with respect to the beam splitter 14. When the second optical switch 16 on the X2 side of the beam splitter 14 is turned on, light propagation is enabled between the beam splitter 14 and a part of the second optical waveguide 13 on the X2 side with respect to the beam splitter 14. The second optical switch 16 includes, for example, a MEMS variable directional coupler.

Two photodetectors 17 are disposed on the side opposite to the second optical waveguide 13 for each of the beam splitters 14. The photodetector 17 detects optical output of the beam splitter 14. The photodetector 17 may be directly coupled to the beam splitter 14, or may be coupled via an optical waveguide or an optical fiber. Examples of the photodetector 17 include a single photon detector.

Next, a quantum computing method using the quantum device 1 according to the first embodiment will be described.

First, an exemplary case where entanglement is performed between, among the three quantum bits 11, the central quantum bit 11 (11B) and the quantum bit 11 (11A) on the X2 side thereof will be described. In this case, the first optical switch 15 disposed on the X1 side of the first optical waveguide 12 (12A) to which the quantum bit 11A is coupled, and the first optical switch 15 disposed on the X2 side of the first optical waveguide 12 (12B) to which the quantum bit 11B is coupled are turned on. In addition, the two second optical switches 16 between the first optical waveguide 12A and the first optical waveguide 12B are turned on.

When the quantum bits 11A and 11B are simultaneously irradiated with light in this state, photons emitted from the quantum bit 11A enter the beam splitter 14 via the first optical waveguide 12A and the second optical waveguide 13, and photons emitted from the quantum bit 11B enter the beam splitter 14 via the first optical waveguide 12B and the second optical waveguide 13. Then, the photons having passed through the beam splitter 14 are input to the two photodetectors 17 in a quantum entanglement state (entangled state).

Next, an exemplary case where the entanglement is performed between, among the three quantum bits 11, the quantum bit 11A on the X2 side of the quantum bit 11B and the quantum bit 11 (11C) on the X1 side will be described. In this case, the first optical switch 15 disposed on the X1 side of the first optical waveguide 12A, and the first optical switch 15 disposed on the X2 side of the first optical waveguide 12 (12C) to which the quantum bit 11C is coupled are turned on. In addition, the two second optical switches 16 provided for either one of the two beam splitters 14 between the first optical waveguide 12A and the first optical waveguide 12C are turned on.

When the quantum bits 11A and 11C are simultaneously irradiated with light in this state, photons emitted from the quantum bit 11A enter the beam splitter 14 via the first optical waveguide 12A and the second optical waveguide 13, and photons emitted from the quantum bit 11C enter the beam splitter 14 via the first optical waveguide 12C and the second optical waveguide 13. Then, the photons having passed through the beam splitter 14 are input to the two photodetectors 17 in a quantum entanglement state (entangled state).

In the first embodiment, quantum computing is performed in this manner. That is, even when any combination of the three quantum bits 11 is coupled to each other, there is no need to relay (swap operation) quantum information via the other one of the quantum bits 11. As described above, according to the first embodiment, it becomes possible to couple the quantum bits 11 without performing the swap operation. The same applies to a case where four or more first optical waveguides 12, to which the quantum bits 11 are coupled, are coupled to the second optical waveguide 13.

Furthermore, in a case of using a diamond color center as a quantum bit in an existing quantum device having a two-dimensional structure, four-way switches as many as the number of quantum bits and beam splitters twice as many as the number of quantum bits are needed. In this case, a unit cell becomes larger, and it is difficult to achieve high integration of the quantum device. On the other hand, according to the present embodiment, the first optical switch 15 and the second optical switch 16 only conduct switching between optical connection and disconnection, whereby elements significantly smaller than the four-way switches may be used as the first optical switch 15 and the second optical switch 16. Furthermore, the number of the beam splitters 14 may be smaller than the number of the quantum bits 11. Therefore, the first embodiment is suitable for high integration.

Second Embodiment

Figure 2:
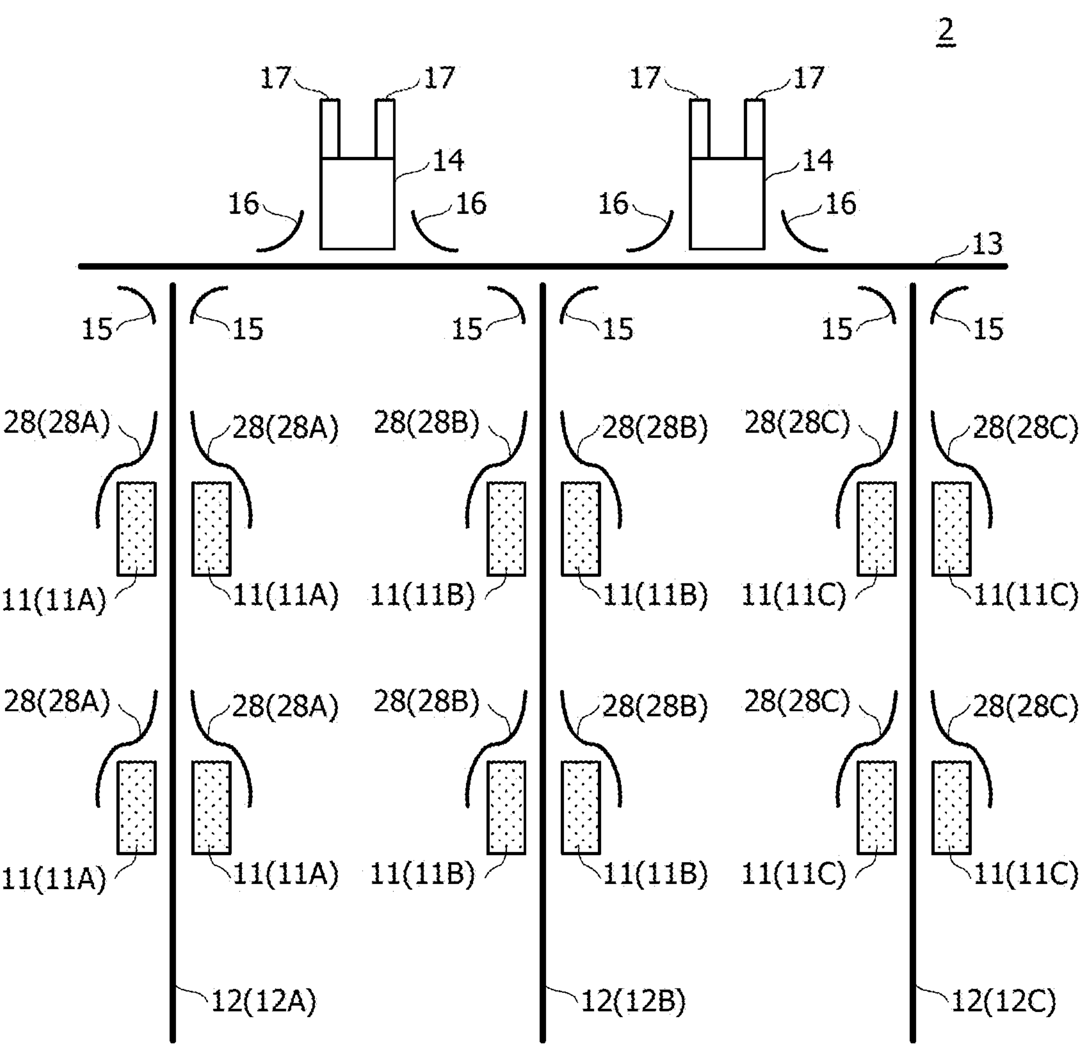
FIG. 2 is a diagram illustrating a quantum device according to a second embodiment.
Figure 2:
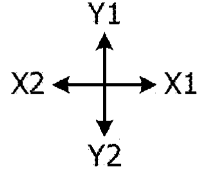

Next, a second embodiment will be described. The second embodiment is different from the first embodiment mainly in that the number of quantum bits coupled to a first optical waveguide. FIG. 2 is a diagram illustrating a quantum device according to the second embodiment.

As illustrated in FIG. 2, in a quantum device 2 according to the second embodiment, a plurality of sets of a quantum bit 11 and a third optical switch 28 are provided for one first optical waveguide 12. The quantum bit 11 is indirectly coupled to the first optical waveguide 12 via the third optical switch 28. The third optical switch 28 conducts switching between optical connection and disconnection between the quantum bit 11 and the first optical waveguide 12. The third optical switch 28 is disposed on the Y1 side of the quantum bit 11. The third optical switch 28 includes, for example, a MEMS variable directional coupler.

Other components are similar to those of the first embodiment.

Next, a quantum computing method using the quantum device 2 according to the second embodiment will be described.

First, an exemplary case where entanglement is performed between one of a plurality of quantum bits 11A provided to a first optical waveguide 12A and one of a plurality of quantum bits 11B provided to a first optical waveguide 12B will be described. In this case, the third optical switch 28 (28A) provided to the quantum bit 11A to be entangled, and the third optical switch 28 (28B) provided to the quantum bit 11B to be entangled are turned on. Furthermore, a first optical switch 15 disposed on the X1 side of the first optical waveguide 12A, and the first optical switch 15 disposed on the X2 side of the first optical waveguide 12B are turned on. Moreover, two second optical switches 16 between the first optical waveguide 12A and the first optical waveguide 12B are turned on.

When the quantum bits 11A and 11B to be entangled are simultaneously irradiated with light in this state, in a similar manner to the first embodiment, photons emitted from the quantum bit 11A enter a beam splitter 14 via the first optical waveguide 12A and a second optical waveguide 13, and photons emitted from the quantum bit 11B enter the beam splitter 14 via the first optical waveguide 12B and the second optical waveguide 13. Then, the photons having passed through the beam splitter 14 are input to the two photodetectors 17 in a quantum entanglement state (entangled state).

Next, an exemplary case where the entanglement is performed between one of the plurality of quantum bits 11A provided to the first optical waveguide 12A and one of a plurality of quantum bits 11C provided to a first optical waveguide 12C will be described. In this case, the third optical switch 28A provided to the quantum bit 11A to be entangled, and the third optical switch 28 (28C) provided to the quantum bit 11C to be entangled are turned on. Furthermore, the first optical switch 15 disposed on the X1 side of the first optical waveguide 12A, and the first optical switch 15 disposed on the X2 side of the first optical waveguide 12C are turned on. Moreover, the two second optical switches 16 provided for either one of the two beam splitters 14 between the first optical waveguide 12A and the first optical waveguide 12C are turned on.

When the quantum bits 11A and 11C to be entangled are simultaneously irradiated with light in this state, in a similar manner to the first embodiment, photons emitted from the quantum bit 11A enter the beam splitter 14 via the first optical waveguide 12A and the second optical waveguide 13, and photons emitted from the quantum bit 11C enter the beam splitter 14 via the first optical waveguide 12C and the second optical waveguide 13. Then, the photons having passed through the beam splitter 14 are input to the two photodetectors 17 in the quantum entanglement state (entangled state).

Effects similar to those of the first embodiment may be obtained also in the second embodiment. Furthermore, the entanglement may be performed among a larger number of the quantum bits 11. Moreover, while the number of the quantum bits 11 is increased from that of the first embodiment, the number of the beam splitters 14 and photodetectors 17 is the same as that of the first embodiment. Therefore, the second embodiment is more suitable for high integration.

Third Embodiment

Figure 3:
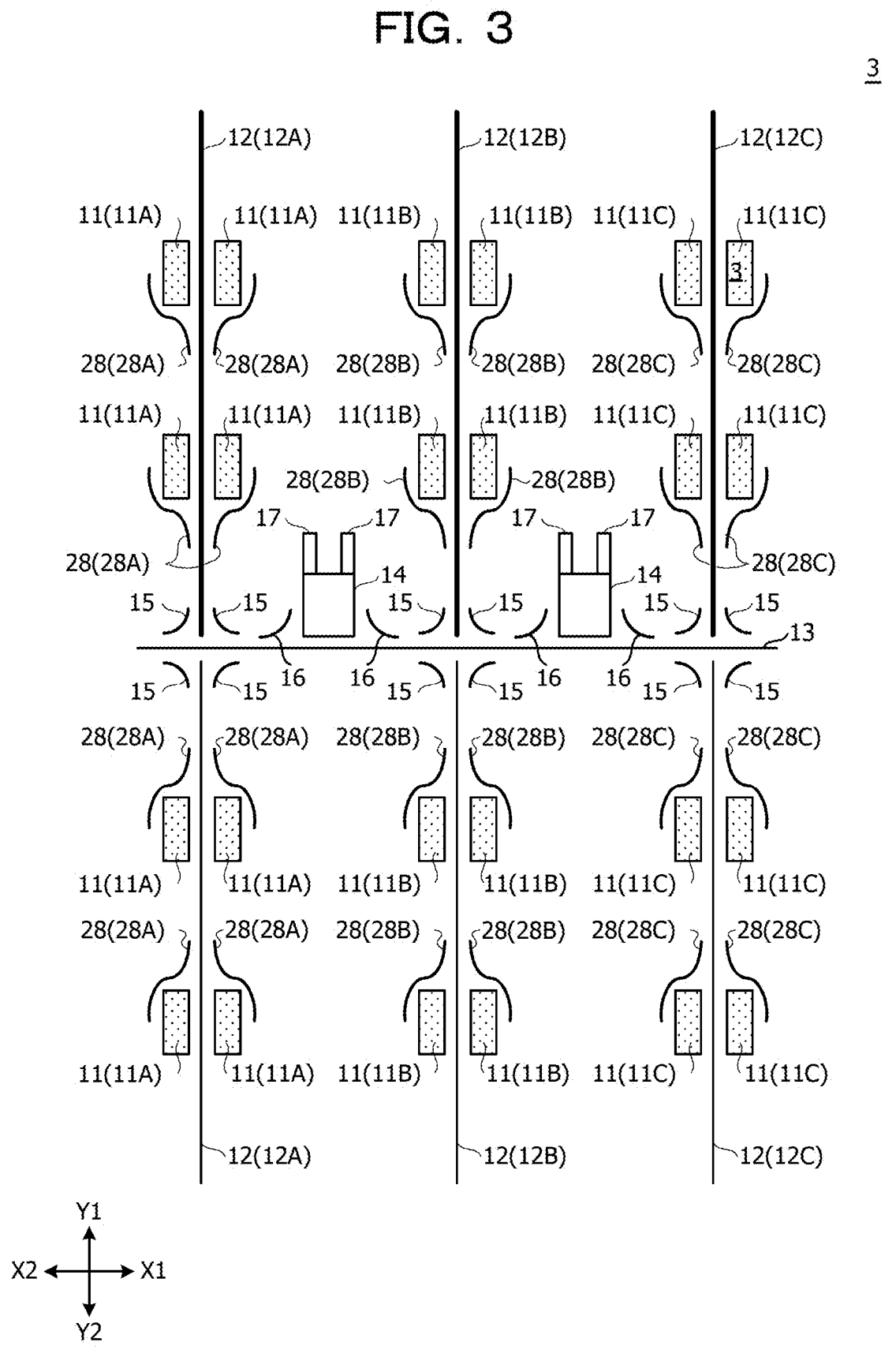

Next, a third embodiment will be described. The third embodiment is different from the second embodiment mainly in that the number of quantum bits coupled to a first optical waveguide. FIG. 3 is a diagram illustrating a quantum device according to the third embodiment.

As illustrated in FIG. 3, in a quantum device 3 according to the third embodiment, three first optical waveguides 12 (12A, 12B, and 12C) are disposed not only on the Y2 side of a second optical waveguide 13 but also on the Y1 side of the second optical waveguide 13. In addition, a plurality of sets of a quantum bit 11 and a third optical switch 28 is provided also for the three first optical waveguides 12 on the Y1 side of the second optical waveguide 13 in a similar manner to the three first optical waveguides 12 on the Y2 side. However, on the Y1 side of the second optical waveguide 13, the third optical switch 28 is disposed on the Y2 side of the quantum bit 11.

In addition, for the three first optical waveguides 12 on the Y1 side of the second optical waveguide 13, two first optical switches 15 are disposed for each of the first optical waveguides 12 in the vicinity of the end portion on the Y2 side of the first optical waveguide 12.

Other components are similar to those of the second embodiment.

Effects similar to those of the second embodiment may be obtained also in the third embodiment. Furthermore, entanglement may be performed among a still larger number of the quantum bits 11. Moreover, while the number of the quantum bits 11 is further increased from that of the second embodiment, the number of beam splitters 14 and photodetectors 17 is the same as that of the second embodiment. Therefore, the third embodiment is more suitable for high integration.

Fourth Embodiment

Figure 4:
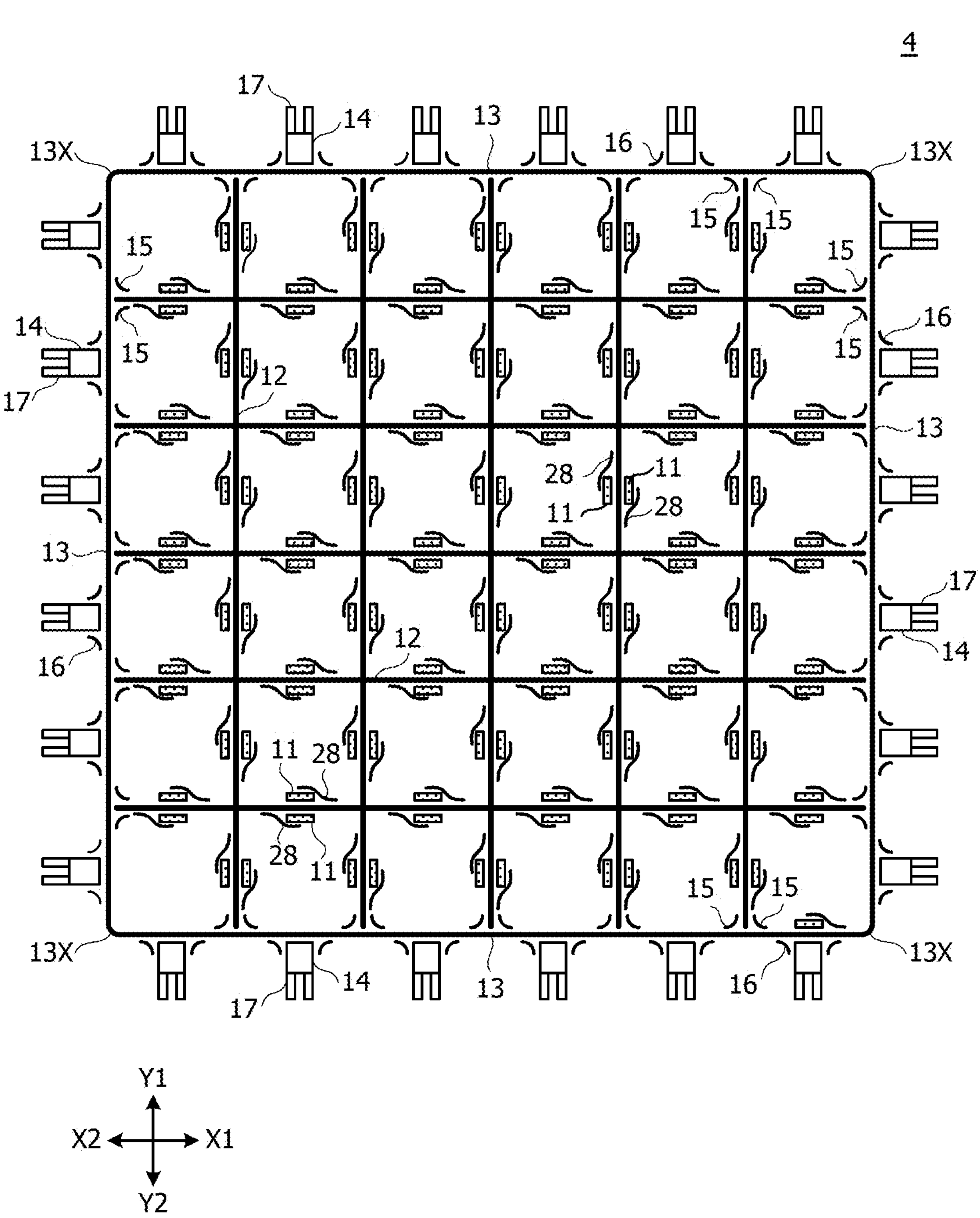
FIG. 4 is a diagram illustrating a quantum device according to a fourth embodiment.

Next, a fourth embodiment will be described. The fourth embodiment is different from the first embodiment mainly in arrangement of first optical waveguides and second optical waveguides. FIG. 4 is a diagram illustrating a quantum device according to the fourth embodiment.

As illustrated in FIG. 4, a quantum device 4 according to the fourth embodiment includes 120 quantum bits 11, ten first optical waveguides 12, four second optical waveguides 13, 24 beam splitters 14, 40 first optical switches 15, 48 second optical switches 16, and 48 photodetectors 17.

Five of the ten first optical waveguides 12 extend in the Y1-Y2 direction, and are arranged in parallel in the X1-X2 direction. In addition, the other five extend in the X1-X2 direction, and are arranged in parallel in the Y1-Y2 direction. The five first optical waveguides 12 extending in the Y1-Y2 direction and the five first optical waveguides 12 extending in the X1-X2 direction are orthogonal to each other. One first optical waveguide 12 is provided with 12 sets of the quantum bit 11 and the third optical switch 28.

For the first optical waveguide 12 extending in the Y1-Y2 direction, two sets of the quantum bit 11 and the third optical switch 28 are disposed in each of a region between intersection points with the first optical waveguide 12 extending in the X1-X2 direction, a region on the Y1 side with respect to the intersection point closest to the Y1 side, and a region on the Y2 side with respect to the intersection point closest to the Y2 side. In each of those regions, one set of the quantum bit 11 and the third optical switch 28 is disposed on each of the X1 side and the X2 side of the first optical waveguide 12. In the set disposed on the X1 side of the first optical waveguide 12, the third optical switch 28 is disposed on the Y2 side of the quantum bit 11. In the set disposed on the X2 side of the first optical waveguide 12, the third optical switch 28 is disposed on the Y1 side of the quantum bit 11.

For the first optical waveguide 12 extending in the X1-X2 direction, two sets of the quantum bit 11 and the third optical switch 28 are disposed in each of a region between intersection points with the first optical waveguide 12 extending in the Y1-Y2 direction, a region on the X1 side with respect to the intersection point closest to the X1 side, and a region on the X2 side with respect to the intersection point closest to the X2 side. In each of those regions, one set of the quantum bit 11 and the third optical switch 28 is disposed on each of the Y1 side and the Y2 side of the first optical waveguide 12. In the set disposed on the Y1 side of the first optical waveguide 12, the third optical switch 28 is disposed on the X1 side of the quantum bit 11. In the set disposed on the Y2 side of the first optical waveguide 12, the third optical switch 28 is disposed on the X2 side of the quantum bit 11.

One of the second optical waveguides 13 extends in the X1-X2 direction, and is disposed in the vicinity of the end portions on the Y1 side of the five first optical waveguides 12 extending in the Y1-Y2 direction and in a manner of being spaced apart from the five first optical waveguides 12. Another one of the second optical waveguides 13 extends in the X1-X2 direction, and is disposed in the vicinity of the end portions on the Y2 side of the five first optical waveguides 12 extending in the Y1-Y2 direction and in a manner of being spaced apart from the five first optical waveguides 12. Another one of the second optical waveguides 13 extends in the Y1-Y2 direction, and is disposed in the vicinity of the end portions on the X1 side of the five first optical waveguides 12 extending in the X1-X2 direction and in a manner of being spaced apart from the five first optical waveguides 12. The remaining one of the second optical waveguides 13 extends in the Y1-Y2 direction, and is disposed in the vicinity of the end portions on the X2 side of the five first optical waveguides 12 extending in the X1-X2 direction and in a manner of being spaced apart from the five first optical waveguides 12. Those four second optical waveguides 13 are coupled to each other via quarter circular arc-shaped optical waveguides 13X coupled to end portions of the individual second optical waveguides 13.

Two first optical switches 15 are disposed in the vicinity of each of both end portions of the first optical waveguide 12. The first optical switch 15 conducts switching between optical connection and disconnection between the first optical waveguide 12 and the second optical waveguide 13.

Each one of eight of the beam splitters 14 is disposed in a region between contact points of the two second optical waveguides 13 extending in the X1-X2 direction with the first optical waveguides 12. Other two of the beam splitters 14 are disposed on the X1 side with respect to the contact points of the two second optical waveguides 13 extending in the X1-X2 direction with the first optical waveguide 12 closest to the X1 side. Other two of the beam splitters 14 are disposed on the X2 side with respect to the contact points of the two second optical waveguides 13 extending in the X1-X2 direction with the first optical waveguide 12 closest to the X2 side. Each one of other eight of the beam splitters 14 is disposed in a region between contact points of the two second optical waveguides 13 extending in the Y1-Y2 direction with the first optical waveguides 12. Other two of the beam splitters 14 are disposed on the Y1 side with respect to the contact points of the two second optical waveguides 13 extending in the Y1-Y2 direction with the first optical waveguide 12 closest to the Y1 side. The remaining two of the beam splitters 14 are disposed on the Y2 side with respect to the contact points of the two second optical waveguides 13 extending in the Y1-Y2 direction with the first optical waveguide 12 closest to the Y2 side.

Two second optical switches 16 are disposed in the vicinity of the second optical waveguide 13 for each of the beam splitters 14. Furthermore, two photodetectors 17 are disposed on the side opposite to the second optical waveguide 13 for each of the beam splitters 14.

According to the fourth embodiment, it becomes possible to couple two quantum bits 11 provided to different first optical waveguides 12 without performing a swap operation. Thus, it becomes possible to couple the quantum bits 11 for more sets. For example, the quantum bits 11 may be coupled without performing the swap operation in a set of the quantum bit 11 provided to the first optical waveguide 12 extending in the X1-X2 direction and the quantum bit 11 provided to the first optical waveguide 12 extending in the Y1-Y2 direction. Moreover, for the 120 quantum bits 11, the number of the beam splitters 14 is only 24. Therefore, it is very suitable for high integration.

Fifth Embodiment

Figure 5:
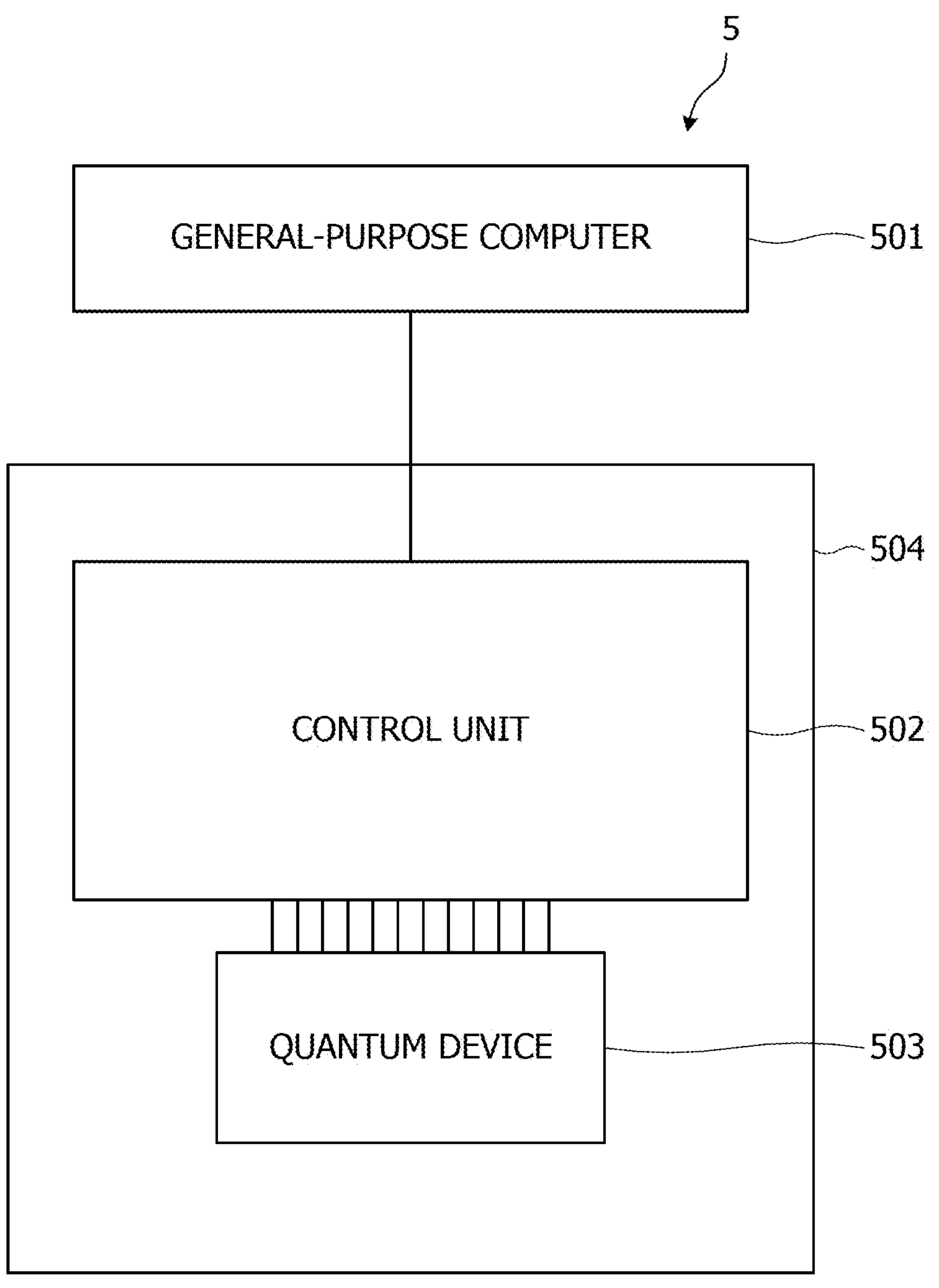
FIG. 5 is a diagram illustrating a quantum computer according to a fifth embodiment.

Next, a fifth embodiment will be described. The fifth embodiment relates to a quantum computer. FIG. 5 is a diagram illustrating the quantum computer according to the fifth embodiment.

A quantum computer 5 according to the fifth embodiment includes a general-purpose computer 501, a control unit 502, and a quantum device 503. The control unit 502 controls the quantum device 503 based on control signals from the general-purpose computer 501. A quantum device according to any one of the first to fourth embodiments is used as the quantum device 503. The control unit 502 and the quantum device 503 are housed in a cryostat 504.

According to the quantum computer 5, it becomes possible to perform stable quantum computing without performing a swap operation.

In the present disclosure, a quantum bit may include a diamond color center for extracting photons using a solid immersion lens. As a quantum bit, a trapped-ion quantum bit using ions, a superconducting quantum bit using an element that converts quantum information into photons, or a silicon quantum bit may be used.

As a material of the optical waveguide, a material capable of transmitting photons, such as sapphire, silicon carbide, silicon nitride, or the like, may be used. An optical fiber may be used as a part of the optical waveguide.

As a material of the photonic crystal used for the beam splitter, a material capable of transmitting photons, such as sapphire, silicon carbide, silicon nitride, or the like, may be used. Furthermore, a half mirror may be used for the beam splitter.

Although the preferred embodiments and the like have been described in detail above, it is not limited to the embodiments and the like described above, and various modifications and substitutions may be made to the embodiments and the like described above without departing from the scope described in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A quantum device comprising:

three first optical waveguides to which a quantum bit is coupled;

a second optical waveguide;

a beam splitter;

a first optical switch that is provided to each of the three first optical waveguides and conducts switching between optical connection and disconnection between the first optical waveguide and the second optical waveguide; and a second optical switch that conducts switching between optical connection and disconnection between the second optical waveguide and the beam splitter.

2. The quantum device according to claim 1, wherein the first optical switch includes a first micro electro mechanical systems (MEMS) variable directional coupler, and the second optical switch includes a second MEMS variable directional coupler.

3. The quantum device according to claim 1, further comprising:

a third optical switch that conducts switching between optical connection and disconnection between the quantum bit and each of the three first optical waveguides.

4. The quantum device according to claim 3, wherein the third optical switch includes a third MEMS variable directional coupler.

5. The quantum device according to claim 3, wherein the quantum device comprises a plurality of sets of the quantum bit and the third optical switch for each of the first optical waveguides.

6. The quantum device according to claim 1, wherein the quantum device comprises a plurality of the beam splitters, and each one of the beam splitters is provided between contact points of the second optical waveguide with the first optical waveguides.

7. The quantum device according to claim 1, wherein the beam splitter includes a photonic crystal.

8. The quantum device according to claim 1, further comprising:

a photodetector that detects optical output of the beam splitter.

9. The quantum device according to claim 1, wherein the quantum bit includes a diamond color center.

10. A quantum computing device comprising:

the quantum device according to claim 1.

11. A quantum computing method that uses a quantum device, wherein the quantum device includes:

three first optical waveguides to which quantum bits that include a diamond color center are coupled;

a second optical waveguide;

a beam splitter;

a first optical switch that is provided to each of the three first optical waveguides and conducts switching between optical connection and disconnection between the first optical waveguide and the second optical waveguide; and a second optical switch that conducts switching between optical connection and disconnection between the second optical waveguide and the beam splitter, the quantum computing method comprising:

controlling the first optical switch to optically couple two of the first optical waveguides with the second optical waveguide;

controlling the second optical switch to optically couple a portion of the second optical waveguide between the two of the first optical waveguides with the beam splitter; and simultaneously irradiating two of the quantum bits coupled to the two of the first optical waveguides with light.

12. The quantum computing method according to claim 11, wherein the quantum device includes a third optical switch that conducts switching between optical connection and disconnection between the quantum bits and the respective three first optical waveguides, the quantum computing method further comprising:

controlling the third optical switch to optically couple the two of the quantum bits with the first optical waveguides before the simultaneously irradiating the two of the quantum bits with the light.

* * * * *